(12) United States Patent
Sugiura et al.

(10) Patent No.: US 8,423,187 B2
(45) Date of Patent: Apr. 16, 2013

(54) AUTONOMOUS ROBOTS WITH PLANNING IN UNPREDICTABLE, DYNAMIC AND COMPLEX ENVIRONMENTS

(75) Inventors: Hisashi Sugiura, Saitama (JP); Herbert Janssen, Dreieich (DE)

(73) Assignee: Honda Research Institute Europe GmbH, Offenbach/Main (DE)

( * ) Notice: Subject to any disclaimer, the term of this patent is extended or adjusted under 35 U.S.C. 154(b) by 567 days.

(21) Appl. No.: 12/714,826

(22) Filed: Mar. 1, 2010

(65) Prior Publication Data

US 2010/0292835 A1 Nov. 18, 2010

(30) Foreign Application Priority Data

May 15, 2009 (EP) .................................... 09160406

(51) Int. Cl.
*G05B 13/04* (2006.01)
(52) U.S. Cl.
USPC .................. 700/250; 700/245; 901/1; 901/50
(58) Field of Classification Search .......................... None
See application file for complete search history.

(56) References Cited

U.S. PATENT DOCUMENTS

| | | | | |
|---|---|---|---|---|
| 5,889,926 A * | 3/1999 | Bourne et al. | ................. | 700/255 |
| 2005/0183569 A1 | 8/2005 | Solomon | | |
| 2008/0009957 A1 * | 1/2008 | Gienger | .......................... | 700/29 |

FOREIGN PATENT DOCUMENTS

EP 1870211 12/2007

OTHER PUBLICATIONS

Low, Kian Hsiang et al., "A Hybrid Mobile Robot Architecture with Integrated Planning and Control", AAMAS, Jul. 15-19, 2002, pp. 219-226.

Vahrenkamp, Nikolaus et al., "Adaptive Motion Planning for Humanoid Robots", International Conference on Intelligent Robots and Systems, Sep. 2008, 6 pages.
Liu, Jindong et al., "A Hybrid Control Architecture for Autonomous Robotic Fish", International Conference on Intelligent Robots and Systems, Oct. 9-15, 2006, 6 pages.
Burns, Brendan; "Exploiting Structure: A Guided Approach to Sampling-Based Robot Motion Planning", Feb. 2007. 179 pages.
Gienger, Michael et al., "Predictive Behavior Generation—A Sensor-Based Walking and Reaching Architecture for Humanoid Robots", 2007, 7 pages.
European Communication/European Search Report, Oct. 22, 2009, a total of 11 pages.
Bram Bolder et al., "Visually Guided Whole Body Interaction", 2007 IEEE International Conference on Robotics and Automation, Apr. 10-14, 2007, pp. 3054-3061.
Witold Jacak et al., "Distributed Planning and Control of Intelligent Robot's Arm Motion Based on Symbolic and Neural Processing", IEEE International Conference on Vancouver, BC, Canada, Oct. 22-25, 1995, pp. 2898-2903.

(Continued)

*Primary Examiner* — Khoi Tran
*Assistant Examiner* — Ryan Rink
(74) *Attorney, Agent, or Firm* — Squire, Sanders (US) LLP

(57) ABSTRACT

A controller for the motion control of a robot, comprises:
- a target input interface for supplying the controller with information about a target to be reached,
- a predicting module predicting at least one future state of the controlled robot using an internal model of the robot,
- a planning module for planning future states of the robot, wherein the planning starts from a predicted state supplied from the predicting module,
- a reactive controller, for outputting motor commands in order to make the controlled robot reach a target, and
- a target arbitrator for selecting the target output by the predicting module or the output from the planning module.

9 Claims, 3 Drawing Sheets

The instant prediction scheme

OTHER PUBLICATIONS

Figure 3:
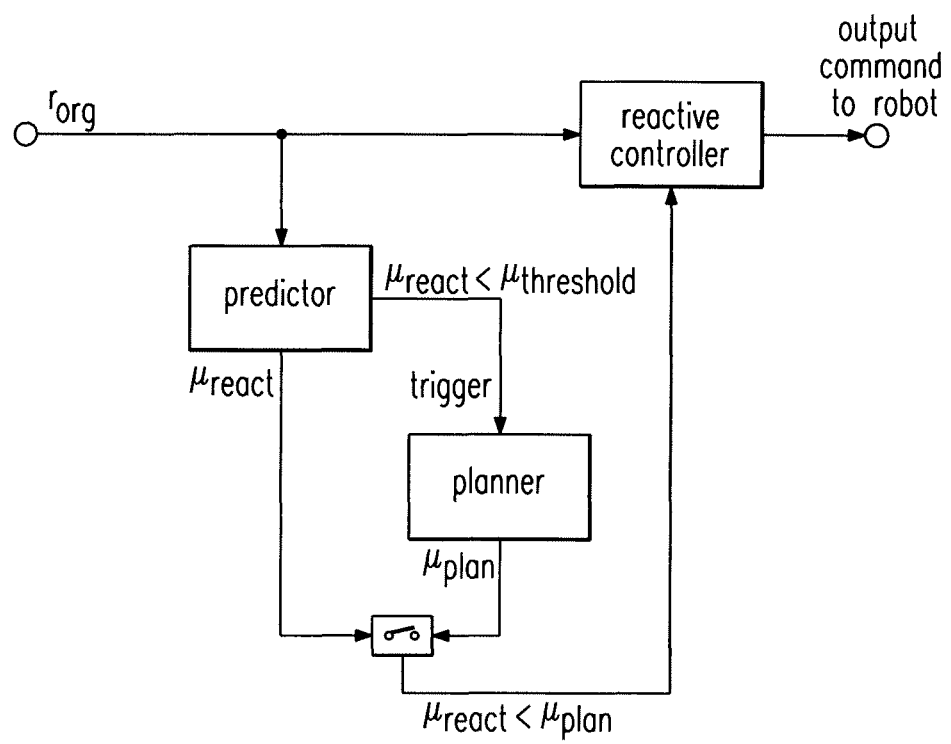

Hisashi Sugiura et al., "Real-Time Collision Avoidance with Whole Body Motion Control for Humanoid Robots", Proceedings of the 2007 IEEE/RSJ International Conference on Intelligent Robots and Systems, San Diego, CA Oct. 29-Nov. 2, 2007, pp. 2053-2058.

Abraham Sanchez et al., "A Reactive Lazy PRM Approach for Nonholonomic Motion Planning", IBERAMIA-SBIA 2006 2nd International Conference, Oct. 27, 2006, pp. 542-551.

* cited by examiner

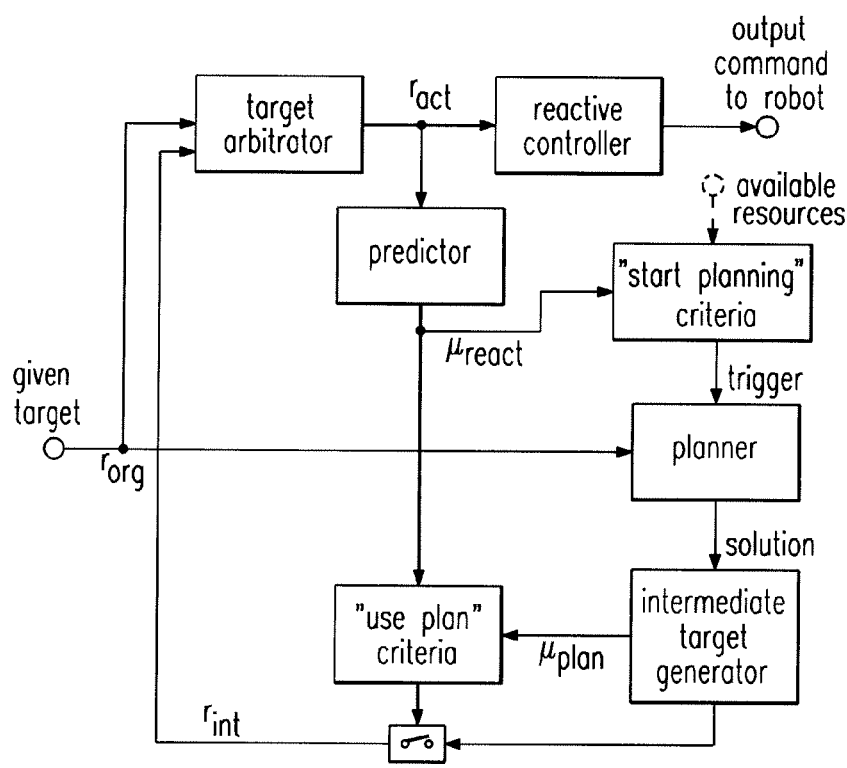
Fig. 1 The instant prediction scheme
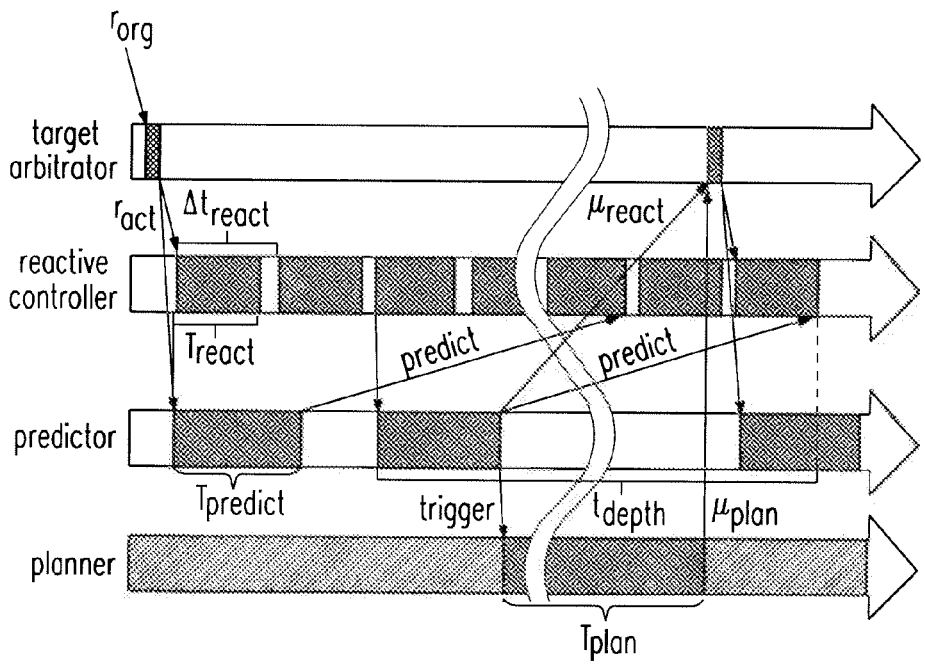
Fig. 2

AUTONOMOUS ROBOTS WITH PLANNING IN UNPREDICTABLE, DYNAMIC AND COMPLEX ENVIRONMENTS

FIELD OF INVENTION

The invention generally relates to the field of autonomous robots, and especially to a method which enables the robot to perform motions in unpredictable and complex environments.

The general knowledge of the skilled person in the present field is exemplified e.g. in Bekey, "Autonomous robots", The MIT Press, 2005.

BACKGROUND

When controlling a movable object like robots, there are essentially two known methods regarding the motion generation: planning and reactive control. The skilled person is well familiar with these two concepts for motion control, see e.g. Bekey.

The planning is basically to plan or schedule optimal motions from the current to the future state. It takes some costs to compute overall motions and therefore it is difficult to react to unpredictable environments. The method is suitable for static or predictable complex environments.

On the other hand, the reactive control computes only the next state with cheaper computational costs. The resulting motions are not optimal and potentially get stuck in local minima. This method is suitable for unpredictable dynamic environments.

OBJECT OF THE INVENTION

It is the object of the invention to propose a technique allowing a robot to perform motion even in complex and unpredictable environments.

The invention proposes the concept of "Instant Prediction" which is capable to generate motions in unpredictable complex environments by integrating these two methods.

The object is particularly achieved by the features of the independent claims. The dependent claims develop further the central idea of the present invention.

A first object of the invention relates to a controller for the motion control of a robot, the controller comprising:
  a target input interface for supplying the controller with information about a target to be reached,
  a predicting module predicting at least one future state of the controlled robot using an internal model,
  a planning module for planning future states of the robot, wherein the planning starts from a predicted state supplied from the predicting module,
  an output stage for outputting motor commands in order to make the controlled robot reach a target, and
  a target arbitrator for selecting the target output by the predicting module or the output from the planning module.

The quality of the motion generated by the predicting module can be computed (using a cost function) and the target generated by the planning module is used for controlling the motion of the robot in case the quality of motion generated by the predicting module is below a preset threshold value.

The invention also relates to a robot provided with a controller as defined above.

The invention also relates to a method for controlling the motion of a robot, the method comprising the steps of:

supplying target input information about a target to be reached,
a predicting at least one future state of the controlled robot,
planning future states of the robot, wherein the planning starts from a predicted state, and
outputting motor commands in order to make the controlled robot reach the target.

Furthermore, the invention proposes a computer program product executing a method as set forth above when run on a computing device.

Further advantages, objects and features of the present invention will become evident for the skilled person when reading the following detailed description of a preferred embodiment of the invention, when taken in conjunction with the figures of the enclosed drawings.

Figure 4:
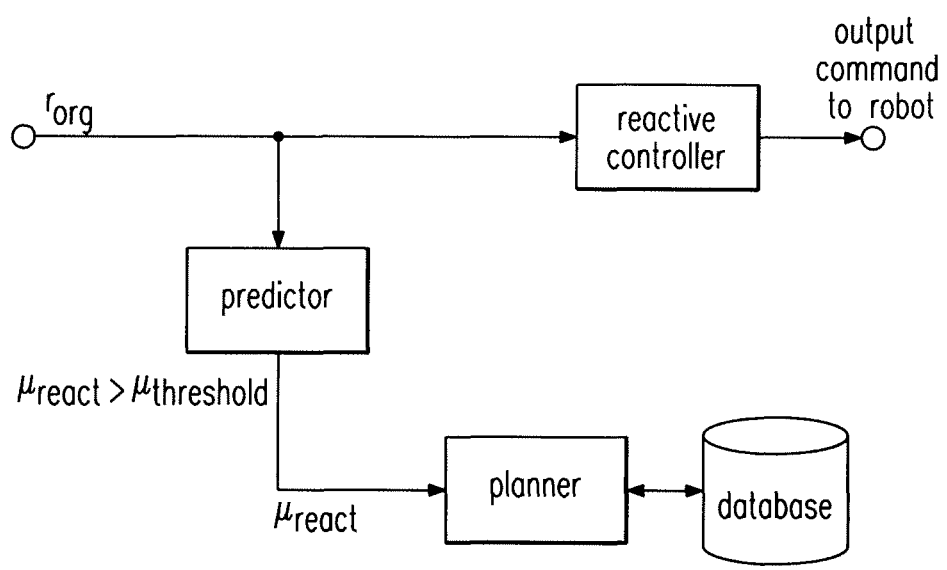

FIG. 1 illustrates the instant prediction scheme according to the present invention, FIG. 2 shows a time chart of a controller according to the invention, FIG. 3 shows a simplified view of a robot controller according to the present invention, FIG. 4 illustrates a controller according to the present invention. When the quality value $\mu_{react}$ is larger than the threshold, the planning module is not used for robot motions. But the planning module, during an ongoing prediction computation, pre-computes and updates motions based on $\mu_{react}$. The pre-computed planning information is stored in the database. The database can be used when the planning module is triggered (upon completion of a prediction computing), thus save computational time and resources.

Figure 5:
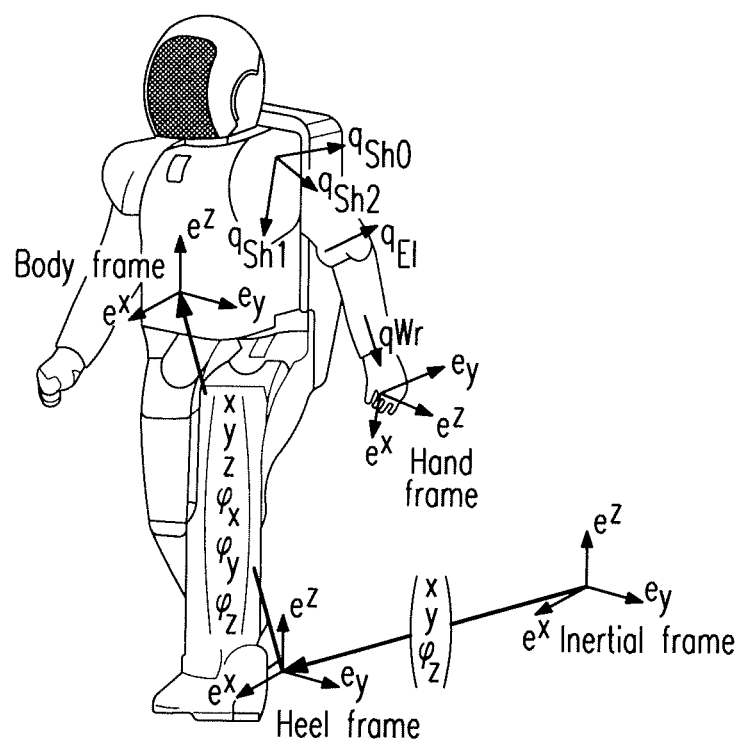

FIG. 5 shows Honda's ASIMO® robot, being a humanoid autonomous robot in which the invention may find application.

The present invention relates to robots, which are provided with a (preferably on-board) computing unit ("controller"). The computing unit is functionally divided in several modules. In the following a method and a module layout according to the invention will be explained which leads in turn to a new behavior of the thus controlled robot.

Instant Prediction Scheme

The overall scheme of the instant prediction is described in FIG. 1.

An original target signal $r_{org}$, instructing a target to be reached by the robot, is supplied e.g. from a vision signal processing system of the associated robot. The original target signal $r_{org}$ is supplied to a target arbitrator module, which receives as a second input an intermediate target signal $r_{int}$ as well as to a planning module.

The target arbitrator module generates an actual target signal $r_{act}$ which is send both to a reactive controller and a predicting module.

The predicting module generates a motion $\mu_{react}$ which is supplied both to a use plan criteria assessing module as well as an input to a start planning criteria assessing module. The start planning criteria assessing module triggers a planning module if it evaluates that the supplied motion $\mu_{react}$ satisfies the start planning criteria.

The start planning module especially triggers the planning module if the motion $\mu_{react}$ supplied from the prediction module indicates difficulties with future states of the robots, such as e.g. parts of the robot getting too close to obstacles or joints or actuators of the robot being too close to extreme (end) positions. The difficulties can be computed by applying a cost function on the supplied motion $\mu_{react}$.

It is important to note that in case the prediction module predicts a difficulty with a future state of the robot, the depicted reactive controller will continue to control the robot according to the behavior which has been predicted as leading to the difficulty. However, parallel in time with the ongoing control by the reactive controller, the planning module will be triggered to start the planning computation. The parallel control of the reactive controller and the planning computation leads to a more efficient control of the robot as the planning module can start the planning computation well before the difficult situation is reached in the real world, due to the prediction of the difficult situation done by the prediction module.

According to the invention thus the control of the robot is not stopped in case a future difficult state is predicted, but rather a planning module is triggered which is designed to compute planned motion able to avoid the future difficult state.

The planning module generates a motion solution signal sent to a intermediate target generating module generating a planned motion fitness value $\mu_{plan}$ send together with the predicted motion fitness value $\mu_{react}$ to a use plan criteria assessing module, which uses criteria to assess whether the planned motion or the predicted motion is used as the internal target signal sent to the target arbitrator module.

The shown system uses the reactive controller to generate motion commands for actors (typically electric motors) of the robot. The prediction module simulates the future robot state using its internal model, the so-called internal prediction module model [see e.g. prior art document 2]. If the fitness value $\mu_{react}$ (computed using a "fitness" or cost function) of the motions of the internal prediction model is insufficient, the planning module is triggered. If the fitness value $\mu_{plan}$ of another motion generated by the planning module is sufficient (i.e. exceeds a preset threshold value), the planned motion $\mu_{plan}$ is sent to the reactive controller as the actual target $r_{act}$ through the target arbitrator. The reactive controller then controls actors (e.g. legs, arms, head) of the robot in order to make the robot achieve the supplied target.

The elements of the scheme are described below along FIG. 1. In the following sections, T* represents the overall computation time for each internal model during N* iteration cycles, ΔT* represents the computation time for each internal model during one iteration and Δt* represents the time increment for each internal model, respectively. The suffix * is predict, react, plan or trig.

FIG. 2 shows a time chart (i.e. the x-axis is the time axis) of a controller according to the invention. Thereby $T_{react}$ is the computation time for the reactive controller which is within the time period $\Delta t^{react}$. $t_{predict}$ is the future prediction depth. The prediction module predicts the robot's future state until the time $t_{predict}$, but it can predict until $t_{trig}$ when the planning module is triggered. $T_{predict}$ is the necessary computation time for predicting the robot's futire state until the time $t_{predict}$.

During the time period until $t_{trig}$, i.e. before the planning module is triggered (which is illustrated with the hashed color in FIG. 2), the planning module utilizes the period for pre-computing. During this period until $t_{trig}$ the planning module prepares the planning on the basis of information which is supplied from the predicting module to the planning module already before the time $t_{trig}$. Thus intermediate results of the state prediction, send continuously or in discrete time steps from the predicting module to the planning module, are used by the planning module to pre-compute the planning already before $t_{trig}$. This pre-computing can comprises e.g. the discretizing of the planning, the check whether any of intermediate positions of the planning or the connections between are too close or even overlap with obstacles, etc.

Target Arbitrator Module

The target arbitrator is activated when a new target $r_{org}$ or an intermediate target $r_{int}$ is given. When it receives the intermediate target, it stores the original given target $r_{org}$ and sends $r_{int}$ to both the reactive controller and the prediction module with time intervals of $r_{act}$. When the target arbitrator module receives a new given target $r_{org}$, the stored data is discarded and it sends the new given target of $r_{act}$.

Reactive Controller

The reactive controller receives $r_{act}$ and computes the motion for the next time slice based on the robot model, the so-called internal reactive model. The resulting motion commands are sent to the robot. Usually the reactive controller comprises some controllers such as a motion controller, a joint limit avoidance controller, a collision avoidance controller and so on.

Prediction Module

The prediction module simulates the robot's future state using the internal prediction module model. The prediction $\mu_{react}$ based on the model. This is a quality measure for the reactive motion which is simulated with the internal prediction module model. The fitness value $\mu_{react}$ represents the complexity of the robot's environment. For example, when the internal prediction module model moves closer to physical obstacles and the model reaches a dead-lock, then the fitness value $\mu_{react}$ is reduced.

The prediction module stops predicting until the planning is finished in order not to trigger the planning module during planning. The internal prediction module model is not necessarily identical to the internal reactive model. It can have fewer DOFs (Degree-of-Freedoms) or a longer time slice interval $\Delta t_{predict}$ than the internal reactive model's time slice $\Delta t_{react}$. These contribute to saving computation time and, therefore, the prediction module can predict further into the future. In contrast, the coarseness of the internal prediction module model causes inaccuracy of the prediction. A finer model can be used in these cases:

when $\mu_{react}$ becomes smaller.
  when the system predicts the near future.
  when the system predicts close to the given target rorg[6].

"Start Planning" Criteria Module

The "start planning" criteria module determines whether to can take the available resources such as computer resources into account if these are limited.

Planning Module

The planning module generates solutions (usually trajectories) which are locally or globally optimized. Any kinds of planning module can be used here, however, faster planning module or planning modules which give a minimal solution even if they are interrupted during the computations are suitable since the time for the planning is restricted.

Intermediate Target Generator

The intermediate target generator converts the solution from the planning module to the intermediate targets $r_{int}$ so that the both fitness values for the reactive motion and the planned motion can be compared and the target arbitrator can deal with it. For example, in case the planning module uses configuration space and the originally given target $r_{org}$, uses the task space, the intermediate target generator converts the configuration space to task space. Based on $r_{int}$ it computes the fitness $\mu_{plan}$ and sends it to the "use plan" criteria.

"Use Plan" Criteria Module

The "Use plan" criteria module compare the fitness values $\mu_{plan}$ and $\mu_{plan}$. Dependent on the fitness values, it determines which intermediate targets are used for $r_{act}$.

Adaptive Planning According to the Invention

The prediction module is able to predict up to the robot future state at the time $t_{predict}$ which is the prediction depth.

Let the computation time for the reactive controller be $T_{react}$, for the prediction module be $T_{predict}$ and for the planning module be $T_{plan}$, respectively.

For the latency compensation, the following condition is necessary.

$$t_{predict} \geq T_{plan} + T_{predict}. \quad (1)$$

Let the prediction iteration cycle for $t_{predict}$ be $N_{predict}$ and the computation time for one cycle be $\Delta T_{predict}$. We obtain:

$$t_{predict} = N_{predict} \Delta t_{predict}, \quad (2)$$

$$T_{predict} = N_{predict} \Delta T_{predict}. \quad (3)$$

Under these conditions, Eq. (1) becomes $$T_{plan} \leq N_{predict} (\Delta t_{predict} - \Delta T_{predict}). \quad (4)$$

If $\Delta t_{predict} - \Delta T_{predict}$ is constant, $N_{predict}$ restricts the computation time for the planning $T_{plan}$.

In static or certain environments, $N_{predict}$ can be sufficiently large for planning. However, if the environments are dynamic or uncertain, the prediction module does not always predict the robot's future state up to $t_{predict}$ because the planning module can be triggered before $t_{predict}$. The time $t_{trig}$ between the start of the prediction module and the triggering of the planning module is $$t_{trig} \leq t_{predict}, \quad (5)$$

$$t_{trig} = N_{trig} \Delta t_{predict}. \quad (6)$$

where $N_{trig}$ is the prediction interaction cycle for $t_{trig}$. Eq. (4) can be formulated as $$T_{plan} \leq N_{trig} (\Delta t_{predict} - \Delta T_{predict}). \quad (7)$$

The planning module is able to use time $T_{plan}$ for planning. When the environment can be predictable the planning module uses sufficient $N_{trig}$ and the environment is fully unpredictable, $N_{trig}=0$, that is the system is equivalent to the reactive controller.

Preparation for Planning

While the interactive (reactive) controller is used for the motions and the planning module is not triggered, the planning module is able to pre-compute for planning when it is necessary. For example, the planning module can generate motions or compute some pre-process such as discretizing the state space in this period and update the motions according to the fitness values computed in the prediction module.

The invention proposes a prediction module which gives sufficient time to the planning module by utilizing the time from the prediction module detects a difficult situation until the real robot encounters the difficult situation. Also the prediction module sends the predicted results to the planning module so that the planning module plans effectively.

SUMMARY

The system uses the reactive controller and when the system encounters a difficult situation, then the system uses the planning module. When the reactive controller is used for motions and the planning module is not used, the planning module computes motions in order to save computation time when the planning module is used for motions. The planning module can take sufficient time to plan motions utilizing the information which is predicted by the prediction module. All process is executed on-line.

The predictor module executes prediction of quality of the reactive motion at future time steps ti up to a max time of $t_{predict}$. If the quality value for any ti becomes smaller than a threshold value then the planning module computes a plan. The time for the planning module is given by $$T_{plan} \leq t_{predict} - T_{predict}$$

Note that $t_{predict}$ can be adapted to the environment.

If the reactive controller is sufficient, i.e. $\mu_{reactive}$ is greater than the preset or adaptive threshold value, the planning module precomputes motions and updates the motions based on the $\mu_{react}$ which represents the environment.

REFERENCES

[1] Brendan Burns. Exploiting Structure: A Guided Approach to Sampling based Robot Motion Planning. Electronic Doctoral Dissertations for UMass Amherst. Paper AAI3275736, 2007.
[2] Michael Gienger, Bram Bolder, Mark Dunn, Hisashi Sugiura, Herbert Janssen, and Christian Goerick. Predictive behavior generation—a sensor-based walking and reaching architecture for humanoid robots. In Karsten Berns and Tobias Luksch, editors, Autonome Mobile Systeme 2007. Springer Verlag, 2007.
[3] Jindong Liu, Huosheng Hu, and Dongbing Gu. A hybrid control architecture for autonomous robotic fish. In Proceedings of the IEEE/RSJ International Conference on Intelligent Robots and Systems 2008, 2008.
[4] Kian Hsiang Low, Wee Kheng Leow, and Jr Marcelo H. Ang. A hybrid mobile robot architecture with integrated planning and control. In Proceedings of the International Conference on Autonomous Agents and Multiagent Systems 2002, 2002.
[5] Neal Solomon. System, methods and appratus for managing a weapon system. In United States Patent Pub. No. US2005/0183569 A1, 2005.
[6] Nikolaus Vahrenkamp, Christian Scheuer, Tamin Asfour, James Kuffner, and Ruediger Dillmann. Adaptive motion planning for humanoid robots. In Proceedings of the IEEE/RSJ International Conference on Intelligent Robotics and Systems 2008, 2008.

The invention claimed is:

1. A controller for controlling a motion of a robot, the controller comprising:
    a target input interface for supplying the controller with information about a target to be reached,
    a predicting module predicting, using a computer, at least one future state of the controlled robot using an internal model of the robot,
    a planning module for planning, using the computer, at least one other future state of the robot, wherein the planning by the planning module starts from the at least one future state predicted by and supplied from the predicting module,
    a reactive controller for outputting motor commands in order to make the controlled robot reach the target, and
    a target arbitrator for outputting an actual target signal to the reactive controller, wherein, upon receiving an intermediate target of the at least one future state, the target arbitrator stores the target to be reached and outputs the intermediate target of the at least one future state,
    wherein the predicting module supplies an intermediate prediction result of the at least one future state to the planning module before a time at which the predicting module finalizes the prediction of the at least one future state and the predicting module triggers the planning module.

2. The controller of claim 1, wherein a quality of a motion generated by the predicting module is computed using a cost function, and the target generated by the planning module is used for controlling the motion of the robot when the quality of the motion generated by the predicting module is below a preset threshold value.

3. The controller of claim 1, wherein, when a quality of a motion generated by the predicting module is below a preset threshold value, the planning module is triggered to start a planning computation while at the same time the reactive controller continues to control the robot.

4. The controller according to claim 3, wherein the planning module is designed to compute planned motion information based on the intermediate prediction result, and to store said planned motion information in a database, in order to use such stored planned motion information upon triggering.

5. The controller according to claim 1, wherein the target arbitrator outputs a reactive controller command for reaching the target based on the prediction by the predicting module or the planning by the planning module supplied from the target arbitrator as motor commands.

6. A robot comprising a controller for controlling a motion of the robot, the controller comprising:
  a target input interface for supplying the controller with information about a target to be reached,
  a predicting module predicting, using a computer, at least one future state of the controlled robot using an internal model of the robot,
  a planning module for planning, using the computer, at least one other future state of the robot, wherein the planning by the planning module starts from the at least one future state predicted by and supplied from the predicting module,
  a reactive controller for outputting motor commands in order to make the controlled robot reach the target, and
  a target arbitrator for outputting an actual target signal to the reactive controller, wherein, upon receiving an intermediate target of the at least one future state, the target arbitrator stores the target to be reached and outputs the intermediate target of the at least one future state,
  wherein the predicting module supplies an intermediate prediction result of the at least one future state to the planning module before a time at which the predicting module finalizes the prediction of the at least one future state and the predicting module triggers the planning module.

7. A method for controlling a motion of a robot, the method comprising the steps of:
  supplying target input information about a target to be reached,
  predicting by a controller at least one future state of the controlled robot,
  planning at least one other future state of the robot, wherein the planning starts from the predicted at least one future state, and
  outputting motor commands in order to make the controlled robot reach the target,
  wherein the predicting comprises supplying an intermediate prediction result of the at least one future state before a time at which the planning is finalized, and the planning of the at least one other future state is triggered as soon as the predicting the at least one future state is completed.

8. The method according to claim 7, wherein planned motion information is computed based on the intermediate prediction result, and said planned motion information is stored in a database, in order to be used upon being triggered.

9. The method according to claim 7,
  wherein, while the predicting is performed, the intermediate prediction result is used for the planning of the at least one other future state, and subsequently the planning of the at least one other future state is triggered as soon as the predicting of the at least one future state is completed, and
  wherein planning information is computed based on the intermediate prediction result, and said planning information is stored in a database, in order to be used upon being triggered at the time.

* * * * *